United States Patent
Yamane et al.

(10) Patent No.: US 8,601,238 B2
(45) Date of Patent: Dec. 3, 2013

(54) ARITHMETIC PROCESSING APPARATUS, ARITHMETIC PROCESSING SYSTEM, AND ARITHMETIC PROCESSING METHOD WHICH UTILIZE LIMITATION INFORMATION TO PERFORM ENHANCED ARITHMETIC PROCESSING

(75) Inventors: Kenji Yamane, Kanagawa (JP); Tsuyoshi Kano, Tokyo (JP); Masahiro Takahashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 748 days.

(21) Appl. No.: 12/787,013

(22) Filed: May 25, 2010

(65) Prior Publication Data
US 2010/0325387 A1    Dec. 23, 2010

(30) Foreign Application Priority Data
Jun. 17, 2009  (JP) ................................. 2009-144535

(51) Int. Cl.
*G06F 9/00*    (2006.01)

(52) U.S. Cl.
USPC .......................................................... 712/31

(58) Field of Classification Search
USPC .......................................................... 712/31
See application file for complete search history.

(56) References Cited

U.S. PATENT DOCUMENTS

| | | | | |
|---|---|---|---|---|
| 5,590,356 A | * | 12/1996 | Gilbert | 712/31 |
| 6,119,215 A | * | 9/2000 | Key et al. | 712/19 |
| 7,051,121 B2 | | 5/2006 | Ohno et al. | |
| 7,237,041 B2 | * | 6/2007 | Hatte | 710/3 |
| 7,895,412 B1 | * | 2/2011 | Kerr et al. | 712/14 |

FOREIGN PATENT DOCUMENTS

JP    2004-5370    1/2004

* cited by examiner

*Primary Examiner* — Robert Fennema
(74) *Attorney, Agent, or Firm* — Oblon, Spivak, McClelland, Maier & Neustadt, L.L.P.

(57) ABSTRACT

An arithmetic processing apparatus includes: a plurality of processing units connected in series to each other, wherein each of the processing units includes a limitation information setting section in which limitation information, which indicates the amount of arithmetic processing that each of the processing units is to process for data of each arithmetic processing unit, is set; an arithmetic section which executes arithmetic processing on the data of each arithmetic processing unit, according to the limitation information set in the limitation information setting section, by the same program between the plurality of processing units; and a memory in which processing data subjected to the arithmetic processing by the arithmetic section is stored.

14 Claims, 10 Drawing Sheets

PARALLEL PROCESSING (1) IN RELATED ART

PARALLEL PROCESSING (2) IN RELATED ART

FIG.3 CONFIGURATION OF IMAGE PROCESSING SYSTEM

CONFIGURATION OF IMAGE PROCESSING APPARATUS

BUS CONNECTION BETWEEN IMAGE PROCESSING UNITS

INSTALLATION OF PROCESSING PROGRAM

TIME-DIVISION PROCESSING

PROCESSING TIME IN KNOWN PARALLEL PROCESSING

CHECKING OF THE NUMBER OF CONNECTED UNITS

CALCULATION OF TIME LIMIT

SETTING OF TIME LIMIT

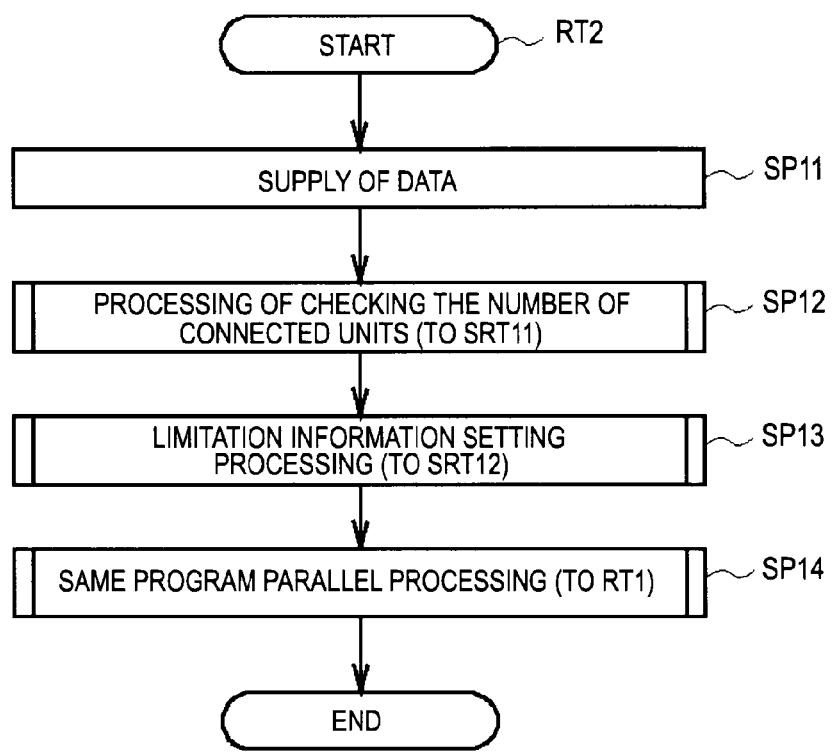
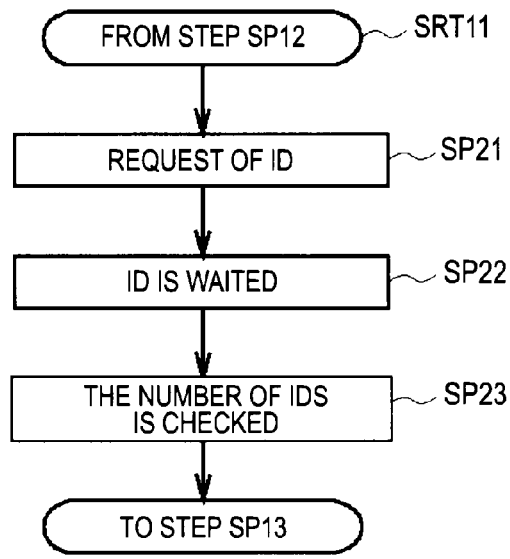

ARITHMETIC PROCESSING APPARATUS, ARITHMETIC PROCESSING SYSTEM, AND ARITHMETIC PROCESSING METHOD WHICH UTILIZE LIMITATION INFORMATION TO PERFORM ENHANCED ARITHMETIC PROCESSING

BACKGROUND OF THE INVENTION

1. Field of the Invention

The present invention relates to an arithmetic processing apparatus, a processing unit, an arithmetic processing system, and an arithmetic processing method, and is suitably applied to an image processing apparatus which encodes a moving image, for example.

2. Description of the Related Art

In the related art, in order to realize arithmetic processing with high processing load, such as image processing of a moving image or hydrodynamic simulation, in a short time, an arithmetic processing system was proposed in which a plurality of processing units were connected to execute parallel processing (for example, refer to JP-A-2004-5370).

In this arithmetic processing system, the parallel processing is generally executed by performing overall control of the arithmetic processing system using a distributed server SV. For example, as shown in FIG. 1, processing units NODE1 to NODE3 are connected to each other through the distributed server SV in the arithmetic processing system.

Moreover, in the arithmetic processing system, the distributed server SV assigns to the three processing units NODE1 to NODE3 a plurality of (three in FIG. 1) tasks Task1 to Task3 that one program PG has, respectively. The distributed server supplies data DATA1 to DATA3 to the processing units NODE1 to NODE3, respectively.

The processing units NODE1 to NODE3 execute the assigned tasks Task1 to Task3 on the data DATA1 to DATA3 and supply the generated processed data DATA1' to DATA3' to the distributed server SV, respectively.

The distributed server SV supplies the data DATA1 to DATA3 to the processing units NODE1 to NODE3, respectively, according to the processing sequence, the progress degree, and the like of the tasks Task1 to Task3 in the processing units NODE1 to NODE3.

SUMMARY OF THE INVENTION

In the arithmetic processing system with such a configuration, however, the distributed server SV executes transaction management, such as supply of the data DATA or progress degree of processing in each of the processing units NODE1 to NODE3. Since the transaction management is complicated, the processing load of the distributed server SV increases. As a result, there was a problem that the configuration became complicated.

Thus, it is desirable to propose an arithmetic processing apparatus, a processing unit, an arithmetic processing system, and an arithmetic processing method capable of realizing the simple configuration.

According to an embodiment of the present invention, there is provided an arithmetic processing apparatus including: a plurality of processing units connected in series to each other. Each of the processing units includes: a limitation information setting section in which limitation information, which indicates the amount of arithmetic processing that each of the processing units is to process for data of each arithmetic processing unit, is set; an arithmetic section which executes arithmetic processing on the data of each arithmetic process-ing unit, according to the limitation information set in the limitation information setting section, by the same program between the plurality of processing units; and a memory in which processing data subjected to the arithmetic processing by the arithmetic section is stored.

In this case, only by executing arithmetic processing according to the limitation information, the arithmetic processing apparatus can execute the arithmetic processing on the data of each arithmetic processing unit in a state where the data of each arithmetic processing unit is divided and assigned to the plurality of processing units. As a result, it is not necessary to execute transaction management.

According to another embodiment of the present invention, there is provided a processing unit including: a limitation information setting section in which limitation information, which indicates the amount of arithmetic processing to be processed for data of each arithmetic processing unit, is set; an arithmetic section which executes arithmetic processing on the data of each arithmetic processing unit, according to the limitation information set in the limitation information setting section, by a program; a memory in which processing data subjected to the arithmetic processing by the arithmetic section is stored; and a connecting section which is bus-connected in series to another processing unit that executes arithmetic processing according to the same program as for the arithmetic section.

In this case, only by executing arithmetic processing according to the limitation information, the processing unit can execute the arithmetic processing on the data of each arithmetic processing unit in a state where the data of each arithmetic processing unit is divided and assigned to the plurality of processing units. As a result, it is not necessary to execute transaction management.

According to still another embodiment of the present invention, there is provided an arithmetic processing system including: a plurality of processing units connected in series to each other; and a server. Each of the processing units includes: a limitation information setting section in which limitation information, which indicates the amount of arithmetic processing that each of the processing units is to process for data of each arithmetic processing unit, is set; an arithmetic section which executes arithmetic processing on the data of each arithmetic processing unit, according to the limitation information set in the limitation information setting section, by the same program between the plurality of processing units; a memory in which processing data subjected to the arithmetic processing by the arithmetic section is stored; and a connecting section which connects between the plurality of processing units. The server supplies the data of each arithmetic processing unit to the processing unit located at the start end of the plurality of processing units and receives the processing data subjected to the arithmetic processing by the arithmetic section from the processing unit located at the final end of the plurality of processing units.

In this case, only by executing arithmetic processing according to the limitation information, the arithmetic processing system can execute the arithmetic processing on the data of each arithmetic processing unit in a state where the data of each arithmetic processing unit is divided and assigned to the plurality of processing units. As a result, it is not necessary to execute transaction management.

According to yet another embodiment of the present invention, there is provided an arithmetic processing method including the steps of: performing first limitation information setting in order to set limitation information indicating the amount of arithmetic processing to be processed for data of each arithmetic processing unit by means of a first processing unit bus-connected in series to a second processing unit; performing first calculation in order to execute arithmetic processing on the data of each arithmetic processing unit by the amount of arithmetic processing to be processed and generate progress information, which indicates an end part of the arithmetic processing, according to a program and the limitation information set in the first limitation information setting by means of the first processing unit; performing first storing in order to store processing data subjected to the arithmetic processing in the first calculation by means of the first processing unit; performing second limitation information setting in order to set the same limitation information as in the first limitation information setting by means of the second processing unit; performing second calculation in order to execute arithmetic processing corresponding to data of each arithmetic processing unit, according to the same program as in the first calculation and the limitation information set in the second limitation information setting, for a portion except the end part, which is indicated by the progress information generated in the first calculation, of the processing data subjected to the arithmetic processing in the first calculation by means of the second processing unit; and performing second storing in order to store processing data subjected to the arithmetic processing in the second calculation by means of the second processing unit.

In this case, in the arithmetic processing method, only by executing arithmetic processing according to the limitation information, it is possible to execute the arithmetic processing on the data of each arithmetic processing unit in a state where the data of each arithmetic processing unit is divided and assigned to the first and second processing units. As a result, it is not necessary to execute transaction management.

According to the embodiments of the present invention, only by executing arithmetic processing according to the limitation information, it is possible to execute the arithmetic processing on the data of each arithmetic processing unit in a state where the data of each arithmetic processing unit is divided and assigned to the plurality of processing units. As a result, it is not necessary to execute transaction management. In this way, in the embodiments of the present invention, it is possible to realize an arithmetic processing apparatus, a processing unit, an arithmetic processing system, and an arithmetic processing method capable of realizing the simple configuration.

BRIEF DESCRIPTION OF THE DRAWINGS

FIG. 14 is a flow chart presented to explain the automatic start procedure;

FIG. 15 is a flow chart presented to explain the procedure of checking the number of connected units.

DESCRIPTION OF THE PREFERRED EMBODIMENTS

Hereinafter, embodiments of the present invention will be described with reference to the accompanying drawings. In addition, the explanation will be given in following order.

1. First embodiment (parallel processing using the same program)

2. Second embodiment (automatic start processing)

3. Other embodiments

<1. First Embodiment>

[1-1. Configuration of an Image Processing System]

Figure 3:
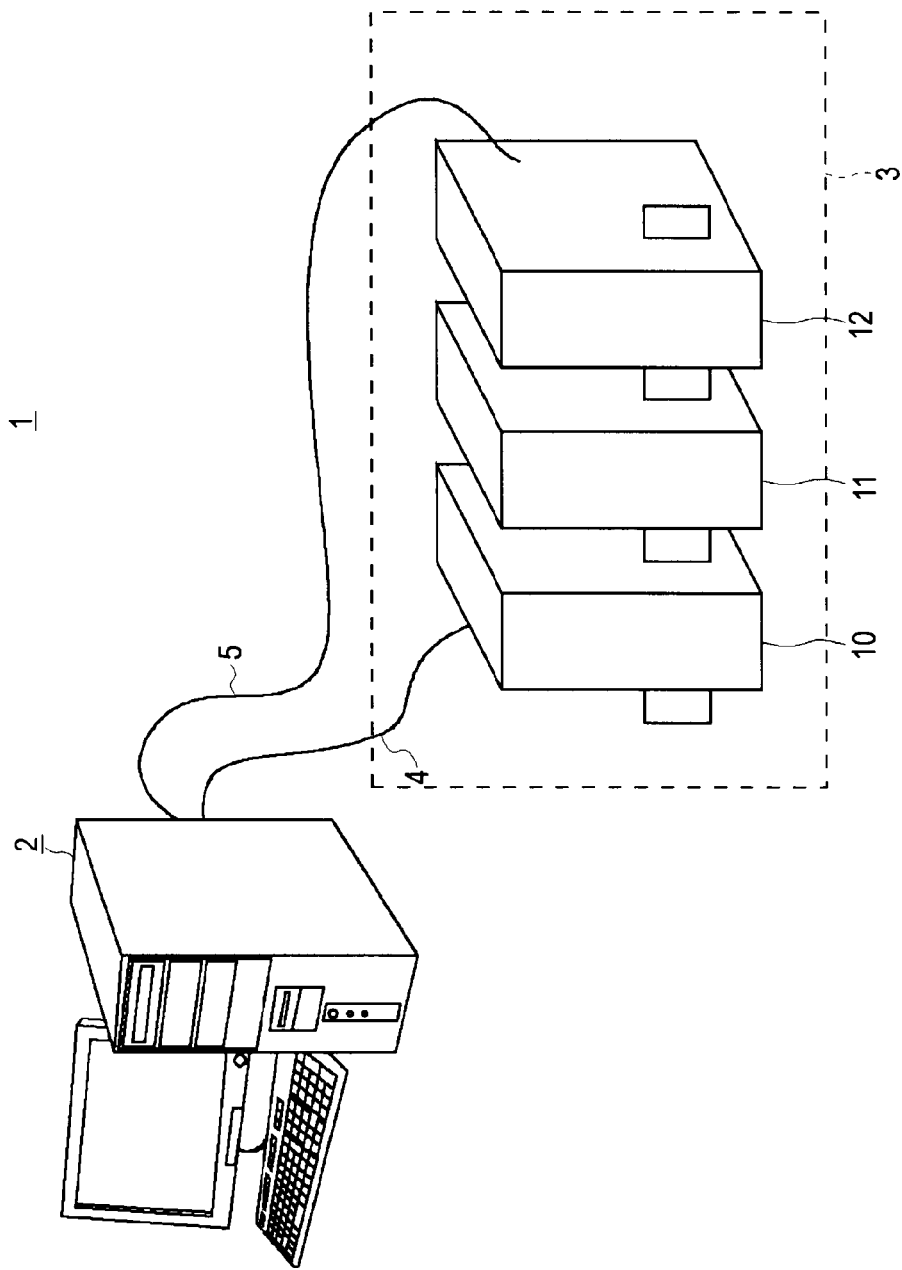
FIG. 3 is a schematic view showing the configuration of an image processing system.

In FIG. 3, reference numeral 1 indicates an imaging processing system as a whole. The image processing system 1 has a server 2 and an image processing apparatus 3. The server 2 and the image processing apparatus 3 are connected to each other by an input cable 4 and an output cable 5.

It is assumed that the image processing system 1 is used for image processing, such as encoding of moving image data. The server 2 supplies image data E1 to the image processing apparatus 3 through the input cable 4. The image processing apparatus 3 generates result data R1 by performing image processing on the image data E1 and supplies the result data R1 to the server 2 through the output cable 5.

Figure 4:
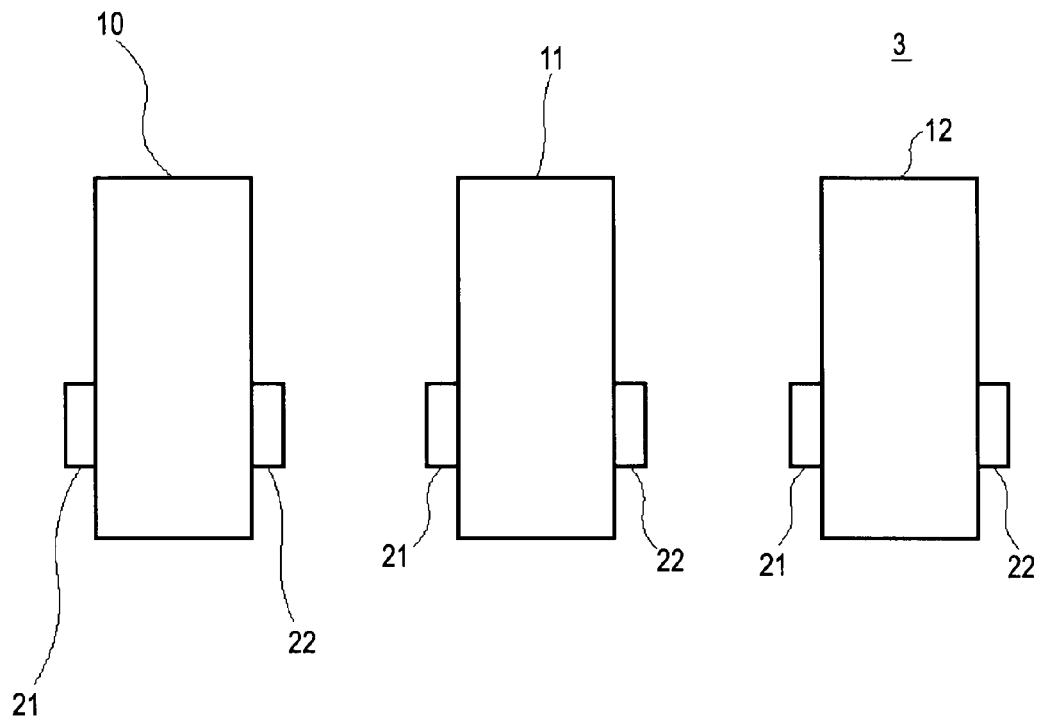
FIG. 4 is a schematic view showing the configuration of an image processing apparatus.

As shown in FIG. 4, the image processing apparatus 3 includes three image processing units 10 to 12. Each of the image processing units 10 to 12 has an input terminal 21 and an output terminal 22, and the input terminal 21 and the output terminal 22 may be connected to each other. The image processing units 10 to 12 are connected to each other by connecting the input terminals 21 and the output terminals 22 of the adjacent image processing units to each other, thereby forming the image processing apparatus 3.

In addition, no connection is made to the input terminal 21 of the image processing unit 10, which has no adjacent image processing unit, and the output terminal 22 of the image processing unit 12, which has no adjacent image processing unit. Thus, the image processing units 10 and 12 can recognize that they are disposed at the ends of the image processing apparatus 3. The image processing units 10 and 12 are connected to the input cable 4 and the output cable 5 by Ethernet (registered trademark), for example. As a result, the image processing units 10 and 12 are connected to the server 2.

That is, in the image processing system 1, the server 2 is connected to both ends of the image processing units 10 to 12 which are continuously connected to each other, and the server 2 and the image processing units 10 to 12 form a loop.

Figure 5:
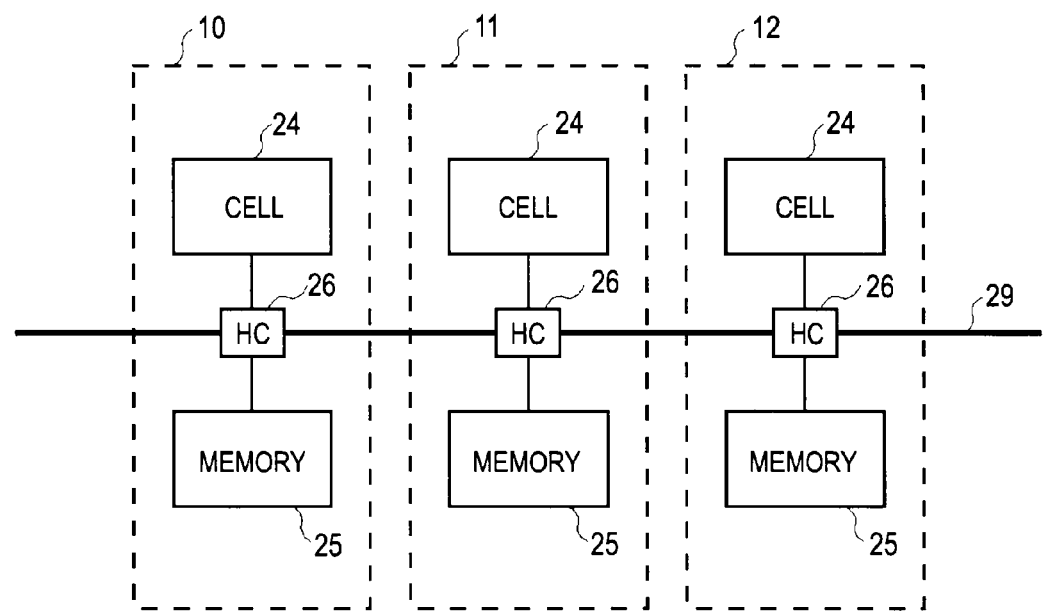
FIG. 5 is a schematic view showing the configuration of bus connection between image processing units.

As shown in FIG. 5, each of the image processing units 10 to 12 has a CELL 24 and a memory 25. The CELL 24 and the memory 25 are connected to a bus 29 through a host controller 26 which controls transmission and reception of data. The input terminal 21 and the output terminal 22 are directly connected to the bus 29.

Accordingly, since the image processing units 10 to 12 are connected to the bus 29 through the input terminal 21 and the output terminal 22, transmission of data between image processing units can be executed at high speed (for example, 25 [Gbps]). In other words, each of the image processing units 10 to 12 can refer to the memory 25 in the adjacent image processing unit by control of the host controller 26 using the connected bus 29.

Figure 6:
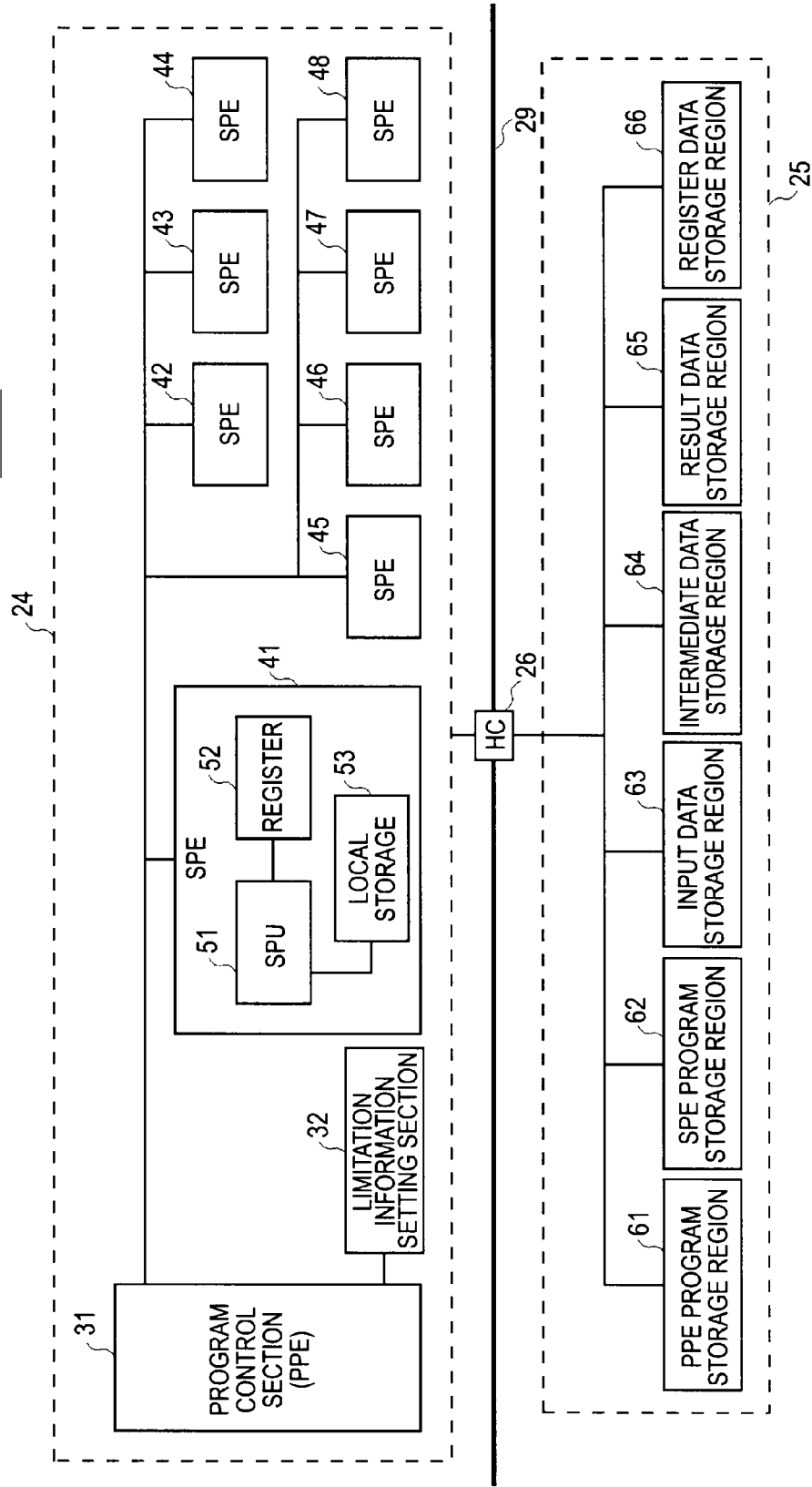
FIG. 6 is a schematic view showing the configuration of an image processing unit.

As shown in FIG. 6, the CELL 24 has a program control section 31 which is a PPE (Power Processor Element) configuration, eight SPEs (Synergistic Processor Elements) 41 to 48, and a limitation information setting section 32.

A region where a program or data is stored is assigned to the memory 25. A PPE program executed by the program control section 31 is stored in a PPE program storage region 61. The program control section 31 performs over all control of the CELL 24 and executes various kinds of processing by reading a PPE program from the PPE program storage region 61 and loading the PPE program to a RAM.

In the present embodiment, the program control sections 31 in the image processing units 10 to 12 execute the same program parallel processing (will be described later in detail) using the same program. Accordingly, the same program is stored in the PPE program storage region 61 in each of the image processing units 10 to 12.

An SPE program executed by the SPEs 41 to 48 is stored in an SPE program storage region 62. Each of the SPEs 41 to 48 has a SPU (Synergistic Processing Unit) 51, a register 52, and a local storage 53. The SPEs 41 to 48 execute various kinds of processing by reading an SPE program from the SPE program storage region 62 and loading the SPE program to the local storage 53. The register 52 is a program count register which counts the progress degree of a program.

In the present embodiment, the SPEs 41 to 48 in the image processing units 10 to 12 execute the same program parallel processing (will be described later in detail) using the same program. Accordingly, the same program is stored in an SPE program storage region 62 in each of the image processing units 10 to 12.

Image data before processing, image data while being processed, and image data after processing are respectively stored in an input data storage region 63, an intermediate data storage region 64, and a result data storage region 65. The image processing units 10 to 12 have storage regions corresponding to the supplied image data or the generated image data.

The image data E1 is input from the server 2 to the image processing unit 10. For this reason, the image processing unit 10 has the input data storage region 63 for storing the image data E1. The image processing unit 10 generates the intermediate data M1 when the image processing has been executed up to the middle. The intermediate data M1 is written in the memory 25 of the image processing unit 11.

The image processing unit 11 has the intermediate data storage region 64 for storing the intermediate data M1. The image processing unit 11 reads the intermediate data M1 and generates intermediate data M2. The intermediate data M2 is written in the memory 25 of the image processing unit 12. The image processing unit 12 reads the intermediate data M2 and generates the result data R1. For this reason, the image processing unit 12 has the result data storage region 65 for storing the intermediate data storage region 64 and the result data R1 for storing the intermediate data M2.

A register data storage region 66 is a region where the progress information in the preceding image processing unit is stored. The progress information indicates the progress degree of the program, and the counter data of the register 52 in the preceding image processing unit is copied.

The host controller 26 controls transmission and reception of the data between the CELL 24 and the memory 25 through the bus 29. In addition, the host controller 26 accesses the host controller 26 of the adjacent image processing unit and executes transmission and reception of data with respect to the memory 25 in the adjacent image processing unit.

Thus, in the image processing system 1, the plurality of image processing units 10 to 12 are connected in series to each other through the high-speed bus 29 to thereby form the image processing apparatus 3. Each of the image processing units 10 to 12 has the CELL 24 in which the plurality of SPEs 41 to 48 are connected in parallel to each other through the program control section 31. That is, the image processing apparatus 3 not only executes high-speed arithmetic processing using the plurality of SPEs 41 to 48 simultaneously but also realizes a further improvement in the speed of arithmetic processing using the plurality of image processing units 10 to 12.

Here, the CELLs 24 realize parallel processing by assignment of tasks similar to parallel processing in the related art. If tasks are assigned to the image processing units 10 to 12 in the same manner, it becomes necessary to assign tasks hierarchically in the image processing system 1. This causes a large limitation in the design of a program.

In the image processing system 1 according to the embodiment of the present invention, therefore, the image processing units 10 to 12 are connected in series to each other so that the same program parallel processing for executing arithmetic processing in an assembly-line manner and in a time-division manner is executed.

[1-2. Same Program Parallel Processing]

Next, the same program parallel processing will be described. In addition, for convenience of explanation, when indicating each section in the image processing units 10 to 12, corresponding reference numerals 10 to 12 indicating the image processing units are suffixed to the reference numeral of each section together with a hyphen. For example, the program control sections 31 in the image processing units 10 to 12 are expressed as program control sections 31-10, 31-11, and 31-12. Regarding common processing of the image processing units 10 to 12, the reference numerals are not given.

[1-2-1. Setting]

Figure 7:
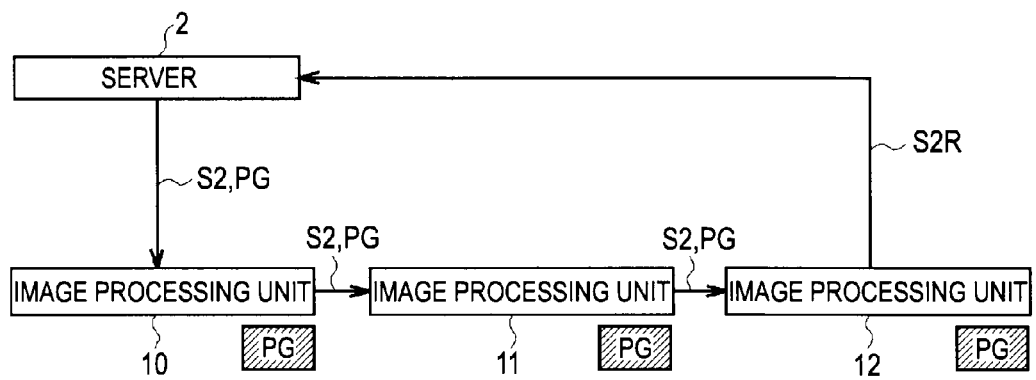
FIG. 7 is a schematic view presented to explain the installation of a processing program.

The server 2 of the image processing system 1 reads a corresponding image processing program from the ROM when there is a request to install an image processing program according to a user's operation on an operating section. As shown in FIG. 7, the server 2 supplies an install request signal S2 and an image processing program PG to the image processing apparatus 3. As a result, the install request signal S2 and the image processing program PG are supplied to the image processing unit 10 of the image processing apparatus 3.

The image processing unit 10 stores the image processing program PG in the PPE program storage region 61-10 and the SPE program storage region 62-10 and also supplies the install request signal S2 and the image processing program PG to the image processing unit 11.

The image processing unit 11 stores the image processing program PG in the PPE program storage region 61-11 and the SPE program storage region 62-11 and also supplies the install request signal S2 and the image processing program PG to the image processing unit 12.

The image processing unit 12 stores the image processing program PG in the PPE program storage region 61-12 and the SPE program storage region 62-12. After the storage of the image processing program PG ends, the program control section 31-12 of the image processing unit 12 generates an end signal S2R and supplies it to the server 2.

As a result, the server 2 can recognize that installation of the image processing program PG has ended for all image processing units 10 to 12 of the image processing apparatus 3.

In addition, the server 2 supplies to the image processing apparatus 3 the time limit information (not shown) and a setting request signal indicating the setting of a time limit according to a user's operation on the operating section.

The program control section 31-10 of the image processing unit 10 sets the time limit (for example, 10 [msec]) in the limitation information setting section 32-10 on the basis of the time limit information and also supplies the setting request signal and the time limit information to the image processing unit 11.

Similarly, the image processing unit 11 also sets the time limit in the limitation information setting section 32-11 on the basis of the time limit information and also supplies the setting request signal and the time limit information to the image processing unit 12.

The program control section 31-12 of the image processing unit 12 sets the time limit in the limitation information setting section 32-12 on the basis of the time limit information, generates an end signal after the setting of the time limit ends, and supplies the end signal to the server 2.

Thus, in the image processing units 10 to 12 in the image processing apparatus 3, the same image processing program is installed and the same time limit is set.

[1-2-2. Image Processing]

Figure 8:
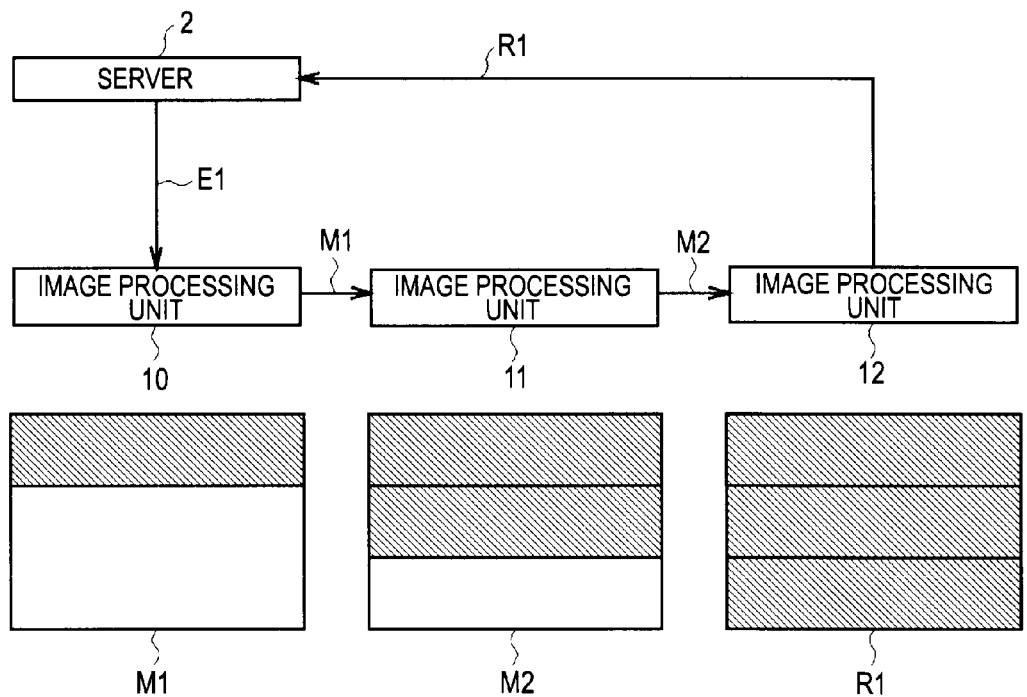
FIG. 8 is a schematic view presented to explain time-division processing.

As shown in FIG. 8, the server 2 of the image processing system 1 supplies the image data E1 to the image processing unit 10 when there is a request to start image processing according to a user's operation on the operating section. The image processing unit 10 stores the supplied image data E1 in the input data storage region 63-10.

The program control section 31-10 of the image processing unit 10 starts the image processing according to the image processing program PG. The program control section 31-10 resets the limitation information setting section 32-10, reads the predetermined image data E1 in a predetermined arithmetic processing unit (for example, a frame image unit or a several frame unit), and stores it temporarily in the local storage 53 of each of the SPEs 41 to 48. The program control section 31-10 executes the image processing using the SPEs 41 to 48. In this case, data while being processed according to the assigned task is stored in the register 52 of each of the SPEs 41 to 48.

For example, when the program control section 31-10 makes seven of the SPEs 41 to 48 execute the image processing, the program control section 31-10 divides into seven parts the image data E1 which is an arithmetic processing unit, and stores it in the local storage 53 of each SPE which executes the image processing. Each SPE which executes image processing executes the image processing on the image data E1 stored in its own local storage 53. That is, in the CELL 24, pipeline processing using a plurality of SPEs is executed.

The program control section 31-10 ends the image processing when the time limit elapses and then writes the progress information, which indicates the progress situation of processing indicated by the register 52-10, in the register data storage region 66-11 of the subsequent image processing unit 11.

In addition, the image processing unit 10 reads the data stored in the register 52-10 of each of the SPEs 41 to 48, and stores it in the register data storage region 66-11 of the subsequent image processing unit 11. The processing of copying the data and the like is executed by some of the SPEs 41-10 to 48-10 which do not execute the image processing.

The program control section 31-11 of the image processing unit 11 monitors its own intermediate data storage region 64-11. When the program control section 31-11 recognizes that the intermediate data M1 is stored, the program control section 31-11 resets the limitation information setting section 32-11 to start image processing. The program control section 31-11 reads the intermediate data M1 of each arithmetic processing unit and stores it in the register 52-11.

Then, the program control section 31-11 reads the progress information from the register data storage region 66-11 and executes image processing from the final end portion at which image processing was executed by the image processing unit 10.

The program control section 31-11 ends the image processing when the time limit elapses and then writes the progress information, which indicates the progress situation of processing indicated by the register 52-11, in the intermediate data storage region 64-12 of the subsequent image processing unit 12. The image processing unit 11 stores the data, which is stored in the local storage 53 of the SPE which executes the image processing, in the intermediate data storage region 64-12. As a result, the intermediate data M1 which has been image-processed is stored as the intermediate data M2 in the intermediate data storage region 64-12. The processing of copying the data and the like is executed by some of the SPEs 41-11 to 48-11 which do not execute the image processing.

The program control section 31-12 of the image processing unit 12 monitors its own intermediate data storage region 64-12. When the program control section 31-12 recognizes that the intermediate data M2 is stored, the program control section 31-12 resets the limitation information setting section 32-12 to start image processing. The program control section 31-12 reads the intermediate data M2 of each arithmetic processing unit and stores it in the register 52-12.

Then, the program control section 31-12 reads the progress information from the register data storage region 66-12 and executes image processing from the final end portion in which image processing was executed by the image processing unit 11.

When the image processing ends, the image processing unit 12 reads the image-processed intermediate data M2 from the register 52-12 and stores it in the result data storage region 65-12 as result data R1. Then, the image processing unit 12 transmits the result data R1 from the output terminal 22-12 in a predetermined bit rate. As a result, the result data R1 subject to the image processing is supplied to the server 2. The processing of transmitting the data and the like to the server 2 is executed by some of the SPEs 41-12 to 48-12 which do not execute the image processing.

In addition, the image processing units 10 and 11 write the intermediate data M1 and M2 in the intermediate data storage region 64 of the subsequent image processing unit and write the progress information in the register data storage region 66 of the subsequent image processing unit.

That is, the image processing unit 10 supplies to the host controller 26-10 the intermediate data M1 read from the local storage 53 after the image processing ends. The host controller 26-10 supplies the intermediate data M1 to the subsequent host controller 26-11. The host controller 26-11 assigns the intermediate data M1 to the intermediate data storage region 64-11. As a result, the intermediate data M1 is stored in the intermediate data storage region 64-11 of the memory 25-11. The same processing is also applied for the progress information. Therefore, it is preferable that the image processing unit 11 reads the intermediate data M1 from its own memory 25.

On the other hand, if the image processing unit 10 stores the intermediate data M1 in its own memory, it is necessary for the image processing unit 11 to read the intermediate data M1 from the memory 25-10. In this case, the program control section 31-11 should give a read request to the host controller 26-10 through the host controller 26-11. In this case, since the bus 29 is used by read request, the data transmission rate decreases.

Thus, the image processing unit 10 writes the intermediate data M1 and the progress information in the intermediate data storage region 64-11 and the register data storage region 66-11 of the subsequent image processing unit. As a result, the image processing unit 10 can increase the data transmission rate significantly, compared with the case where the intermediate data M1 and the progress information stored in its own memory 25 is read to the subsequent image processing unit 11.

Similarly, the image processing unit 11 writes the intermediate data M2 in the intermediate data storage region 64-12 of the subsequent image processing unit 12 and writes the progress information in the register data storage region 66-12.

In addition to the configuration described above, when the image processing units 10 to 12 according to the embodiment of the present invention recognize that the time limit is not proper, an alarm is given to notify it to the user.

If image processing on arithmetic processing units ends within the time limit, the image processing units 10 and 11 which are not the final end of the image processing apparatus 3 recognize that the time limit is not proper and give an alarm.

The program control section 31-12 of the image processing unit 12 which forms the final end of the image processing apparatus 3 checks the limitation information setting section 32-12 after the image processing on arithmetic processing units ends within the time limit. When the remaining time exceeds the remaining time threshold value, the program control section 31-12 recognizes that the setting of the time limit is not proper and gives an alarm. In addition, the remaining time threshold value is set as the rate of the time limit, for example.

Thus, since the image processing apparatus 3 can notify the user in which of the image processing units 10 to 12 image processing has ended, the user can set the appropriate time limit.

On the other hand, the program control section 31-12 of the image processing unit 12 gives an alarm when image processing on arithmetic processing units does not end even though the time limit has elapsed. Different sounds or patterns from that when the time limit exceeds the remaining time threshold value are used as the alarm. In this case, the image processing unit 12 can notify the user of whether the time limit is too large or too small.

Thus, by allowing each of the image processing units 10 to 12 to execute image processing by the time limit in the image processing apparatus 3, the same program parallel processing using the plurality of image processing units 10 to 12 can be executed without performing transaction management.

Since the image processing units 10 to 12 execute the image processing according to the same program, it is not necessary to divide tasks by the image processing program. As a result, it is possible to improve the degree of freedom in the design of an image processing program.

[1-3. Processing Procedure]

Next, the same program parallel processing procedure RT1 executed according to an image processing program will be described using a flow chart shown in FIG. 9.

When the same program parallel processing procedure RT1 starts, the program control section 31 in each of the image processing units 10 to 12 moves to step SP1. The program control section 31 determines whether or not the data or the like to be processed (image data E1 and intermediate data M1 and M2) is present in a storage region to be referred to (input data storage region 63-10 and intermediate data storage regions 64-11 and 64-12).

If a negative result is obtained here, the program control section 31 waits until the data or the like to be processed is supplied in step SP1. On the other hand, if a positive result is obtained in step SP1, the program control section 31 moves to next step SP2.

In step SP2, the program control section 31 copies the data or the like to be processed, which is necessary for the local storage 53. Then, the program control section 31 moves to next step SP3.

In step SP3, the program control section 31 resets the limitation information setting section 32 to start counting of the time limit. Then, the program control section 31 moves to next step SP4.

In step SP4, the program control section 31 executes image processing on the data to be processed. Then, the program control section 31 moves to next step SP5.

In step SP5, the program control section 31 determines whether or not the time limit has elapsed. If a negative result is obtained in step SP5, the program control section 31 returns to step SP4 to continue image processing.

On the other hand, if a positive result is obtained in step SP5, the program control section 31 moves to next step SP6.

In step SP6, the program control section 31 copies the data (data to be processed, result data R1, and register information), which is to be copied into the memory 25, in the data storage region (register data storage regions 66-11 and 66-12, intermediate data storage regions 64-11 and 64-12, result data storage region 65-12) to be copied. Then, the program control section 31 moves to next step SP7.

In step SP7, the program control section 31 determines whether or not the execution of image processing on all arithmetic processing units has ended. If a negative result is obtained in step SP7, the program control section 31 returns to step SP1 to execute processing on the next arithmetic processing unit.

On the other hand, if a positive result is obtained in step SP7, the program control section 31 moves to an end step to end the same program parallel processing procedure RT1 since the execution of image processing on all arithmetic processing units has ended.

In addition, the series of same program parallel processing described above may be executed by hardware or by software. When the same program parallel processing is realized by software, the image processing apparatus 3 is virtually formed in a CPU and a RAM. Then, the same program parallel processing is executed by loading an image processing program stored in a ROM to the RAM.

[1-4. Operations and Effects]

In the above configuration, in the image processing apparatus 3 of the image processing system 1, the image processing units 10 to 12 as a plurality of processing units are bus-connected in series to each other. Each of the image processing units 10 to 12 has the limitation information setting section 32 in which the time limit as limitation information, which indicates the amount of arithmetic processing that each of the plurality of image processing units 10 to 12 is to process for data of each arithmetic processing unit, is set.

Each of the image processing units 10 to 12 executes image processing as arithmetic processing on the data (image data E1 or intermediate data M1 or M2) of each arithmetic processing unit, according to the same program among the plurality of image processing units 10 to 12, using the CELL 24 as an arithmetic section.

Each of the image processing units 10 to 12 executes image processing on the data of each arithmetic processing unit according to the time limit set in the limitation information setting section 32. Each of the image processing units 10 to 12 stores in the memory 25 the processing data (intermediate data M1 or M2 or result data R1) subjected to the image processing. The image processing units 10 to 12 are bus-connected to each other by connecting the input terminals 21 and the output terminals 22 of the plurality of image processing units 10 to 12 to each other.

The image processing apparatus 3 can generate the result data R1 by making the image processing units 10 to 12 execute the same image processing in an assembly-line manner for the time limit according to the same program. In this case, the image processing apparatus 3 can smoothly execute the transmission of data between the image processing units 10 to 12 by bus connection.

That is, the image processing apparatus 3 divides the image data E1 of each arithmetic processing unit into three parts substantially and assigns them to the image processing units 10 to 12 in order to execute image processing. However, the image processing apparatus 3 executes the image processing in a state where the image processings in the image processing units 10 to 12 are shifted from each other in time, in such a manner that image processing in a preceding image processing unit ends and then the rest is executed by a subsequent image processing unit.

In this case, the image processing apparatus 3 executes the image processing by making each of the image processing units 10 to 12 execute only the management of their own time limits. In other words, in the image processing apparatus 3, a region where image processing is to be performed is automatically determined by the time limit. Accordingly, it is not necessary to provide a control unit that executes processing of dividing the image data E1.

Moreover, since the image processing units 10 to 12 are bus-connected to each other, the intermediate data M1 and M2 which is necessary when the image processing units 11 and 12 are necessary can be acquired only by storing the image-processed intermediate data M1 and M2 in the memory 25. That is, in the image processing apparatus 3, it is not necessary to provide a control unit that manages the exchange of data between the image processing units 10 to 12.

As a result, since it is not necessary to execute transaction management, the configuration of the image processing apparatus 3 can be simplified.

Figure 1:
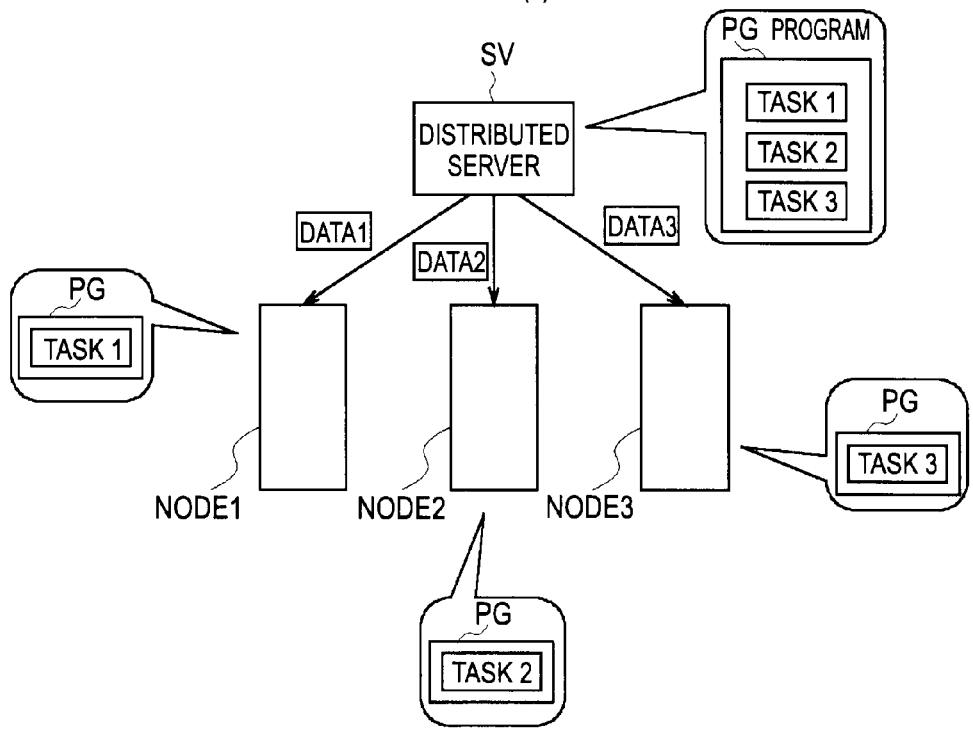
FIG. 1 is a schematic view presented to explain parallel processing (1) in the related art.
Figure 2:
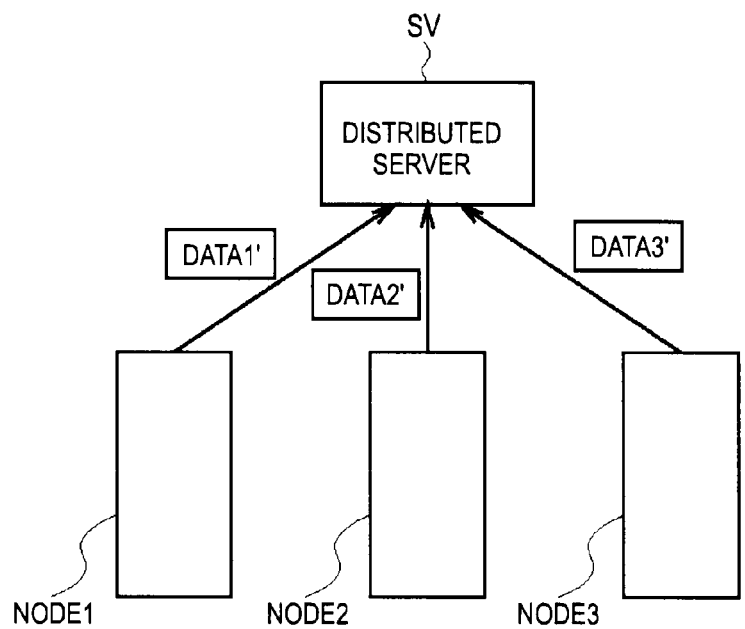
FIG. 2 is a schematic view presented to explain parallel processing (2) in the related art.
Figure 10:
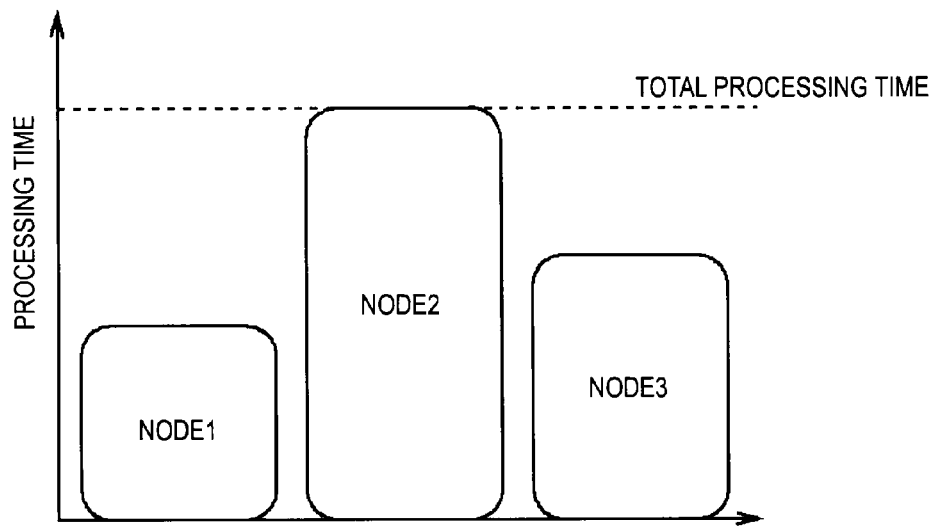
FIG. 10 is a schematic view showing the processing time in parallel processing in the related art.

In addition, as described above, the general image processing apparatus in the related art assigns tasks to a plurality of processing units NODE (FIG. 1). As shown in FIG. 10, in a known image processing apparatus, when processing times of processing units are different, the processing unit NODE2 in which the longest processing time is necessary becomes a rate-limiting factor to thereby determine the total processing time. In this case, since the processing units NODE1 and NODE3 should wait until the processing of the processing unit NODE2 ends, it was difficult to use the throughput of the processing units NODE1 and NODE3.

In the image processing apparatus 3, however, such a problem does not occur because image processing is executed under management of the time limit. Accordingly, it is possible to maximize the throughput of the image processing units 10 to 12.

Moreover, in the image processing apparatus 3, debugging is easy since the image processing is executed according to the same program. In addition, since it is not necessary to design a program in consideration of division of tasks, it is possible to improve the degree of freedom in the design of a program.

For example, in known processing units which execute pipeline processing, the image data E1 is divided into a plurality of parts in advance to execute the processing. For this reason, in the known processing units, image processing is separately executed for every divided region. Accordingly, reference between the divided regions was difficult. For example, when encoding an image, it is difficult for the known processing units to refer to adjacent pixels in the divided boundary. As a result, encoding efficiency or the quality of an image decreases.

In the image processing apparatus 3, the image processing units 10 to 12 execute image processing on different regions of the image data E1 of each arithmetic processing unit, but image processing of the preceding image processing unit ends and then the subsequent image processing unit executes the rest. For this reason, even in the boundary of regions divided by the time limit, the image processing apparatus 3 can refer to adjacent pixels. Accordingly, a decrease in the encoding efficiency or the quality of an image does not occur.

That is, although the image processing apparatus 3 executes image processing with the plurality of image processing units 10 to 12, it is possible to execute the same image processing as image processing using one image processing unit. Therefore, compared with the case of increasing the operation capability of an image processing unit, the image processing apparatus 3 can exhibit the same performance with a simple configuration.

Each of the image processing units 10 to 12 recognizes whether or not it is the end of the image processing apparatus 3 on the basis of the existence of connection of other image processing units to its input terminal 21 and output terminal 22. The image processing units 10 and 11 which have recognized that they are not the final end of the image processing apparatus 3 execute the arithmetic processing according to the time limit set in the limitation information setting section 32 and then store the intermediate data M1 and M2, which has been subjected to the arithmetic processing, in the memories 25-11 and 25-12 of the subsequent image processing units 11 and 12.

The image processing units 10 and 11 store the progress information, which indicates the progress degree of the arithmetic processing according to the program, in the memories 25-11 and 25-12 of the subsequent image processing units 11 and 12.

In this case, since the image processing units 11 and 12 can just read the intermediate data M1 and M2 stored in their own memories 25-11 and 25-12, it is not necessary to use the bus 29 which connects between the adjacent image processing units. For this reason, since the image processing units 11 and 12 can use the bus 29 only when writing the intermediate data M1 and M2, it is possible to maximize the transmission capability of the bus 29.

The CELL 24 serving as an arithmetic section in each of the image processing units 10 to 12 has the SPEs 41 to 48 as a plurality of calculators and the program control section 31 which assigns tasks to the plurality of SPEs 41 to 48.

Here, if the preceding image processing unit does not end image processing, it is difficult for the subsequent image processing unit to start image processing. As a result, in the image processing apparatus 3, a latency time of "(number of image processing units−1)×time limit" occurs until the image processing unit located at the final end starts image processing. If the image processing apparatus 3 executes the same program parallel processing in the CELL 24, the latency time also occurs in the CELL 24.

By executing the pipeline processing, which is a known technique, in the CELL 24, the image processing apparatus 3 can prevent the latency time from becoming cumulatively large. As a result, it is possible to efficiently maintain the balance of not reducing the quality of an image.

In addition, by making the CELL 24 execute general-purpose pipeline processing, the image processing apparatus 3 can execute the same program parallel processing using a program designed for general purpose.

The image processing unit 11 recognizes that it is not the final end of the image processing apparatus 3 on the basis of connections of the image processing units 10 and 12 to the input terminal 21 and the output terminal 22. The image processing unit 11 gives an alarm as warning when image processing on the intermediate data M1 of each arithmetic processing unit ends even though arithmetic processing corresponding to the amount (time limit) of arithmetic processing to be processed, which is indicated by the time limit information as limitation information, has not been completed yet.

Accordingly, the image processing unit 11 can notify the user that the set time limit is not proper. Moreover, since the image processing unit 11 can notify that image processing has ended in the image processing unit 11, the user can easily predict the proper time limit.

When the image processing unit 12 recognizes that it is the final end of the image processing apparatus 3, the image processing unit 12 gives, as warning, an alarm that image processing on the data of each arithmetic processing unit has not ended even though the image processing has been executed by the time limit.

Accordingly, the image processing unit 12 can notify the user that the set time limit is not proper.

After ending the image processing on the data of each arithmetic processing unit within the time limit, the image processing unit 12 gives an alarm as warning when the remaining time limit is large.

Accordingly, the image processing unit 12 can notify the user that the set time limit is not proper.

According to the above-described configuration, in the image processing apparatus 3, the image processing unit 10 as a first processing unit and the image processing unit 11 as a second processing unit are bus-connected in series to each other. A time limit is set in the image processing unit 10. According to the program and the time limit, the image processing unit 10 executes image processing on the image data E1 of each arithmetic processing unit by the time limit and generates the progress information indicating an end part of the image processing. The image processing unit 10 stores the intermediate data M1, which is the processing data subjected to image processing, in the intermediate data storage region 64.

The image processing unit 11 sets the same time limit as in the image processing unit 10. The image processing unit 11 executes image processing corresponding to data of each arithmetic processing unit, according to the same time limit and the same program as in the image processing unit 10, for the intermediate data M1 except the end part indicated by the progress information (that is, from the final end portion). The image processing unit 11 stores the intermediate data M2, which is the processing data subjected to image processing, in the intermediate data storage region 64.

Accordingly, the image processing apparatus 3 can execute image processing in a state where the image processing is divided and assigned to a plurality of image processing units. In addition, since the image processing apparatus 3 can execute the image processing in such a manner that the preceding image processing unit 10 executes image processing and then the subsequent image processing unit 11 executes the image processing by the executable amount, it is possible to omit the transaction management. In this way, in the embodiment of the present invention, it is possible to realize an arithmetic processing apparatus, a processing unit, an arithmetic processing system, and an arithmetic processing method capable of realizing the simple configuration.

<2. Second Embodiment>

[2-1. Configuration of an Image Processing Apparatus]

In a second embodiment shown in FIGS. 11 to 16, elements corresponding to those in the first embodiment shown in FIGS. 1 to 10 are denoted by the same reference numerals, and an explanation regarding the same elements will be omitted. The second embodiment is different from the first embodiment in that the time limit is automatically set. Moreover, in the present embodiment, reference numerals obtained by adding 100 to elements corresponding to those in the first embodiment are used.

In practice, a server 2 of an image processing system 1 supplies image data E1 to an image processing unit 110 when there is a request to start image processing. The image processing unit 110 executes processing of checking the number of connected units while storing the supplied image data E1 in an input data storage region 63-110.

Figure 11:
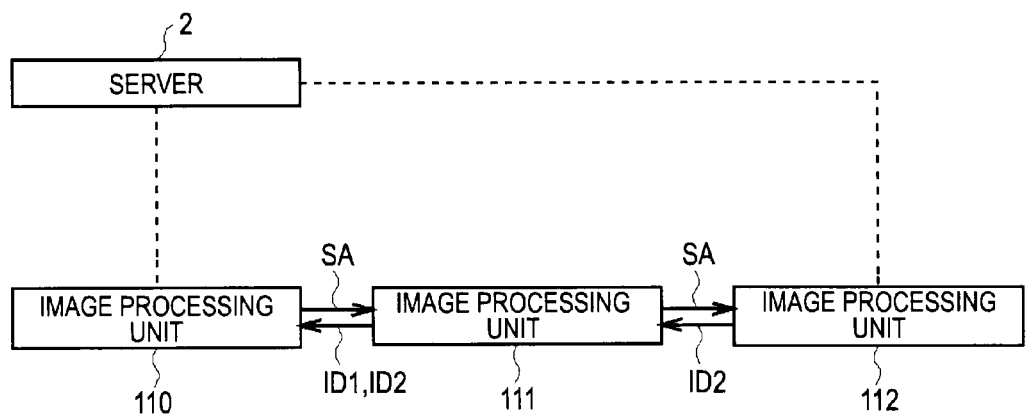
FIG. 11 is a schematic view presented to explain the checking of the number of connected units.

That is, as shown in FIG. 11, a program control section 131-110 of the image processing unit 110 which forms the start end of an image processing apparatus 103 supplies a request signal SA, which requests an identification number ID, to all image processing units 111 and 112 connected. In response to this request, program control sections 131-111 and 131-112 of the image processing units 111 and 112 supply identification numbers ID1 and ID2 to the program control section 131-110.

As a result, the program control section 131-110 can recognize the number, which is obtained by adding "1" corresponding to itself to the number of received identification numbers IDs, as the number of image processing units provided in the image processing apparatus 103.

Then, the program control section 131-110 executes limitation information setting processing.

Figure 12:
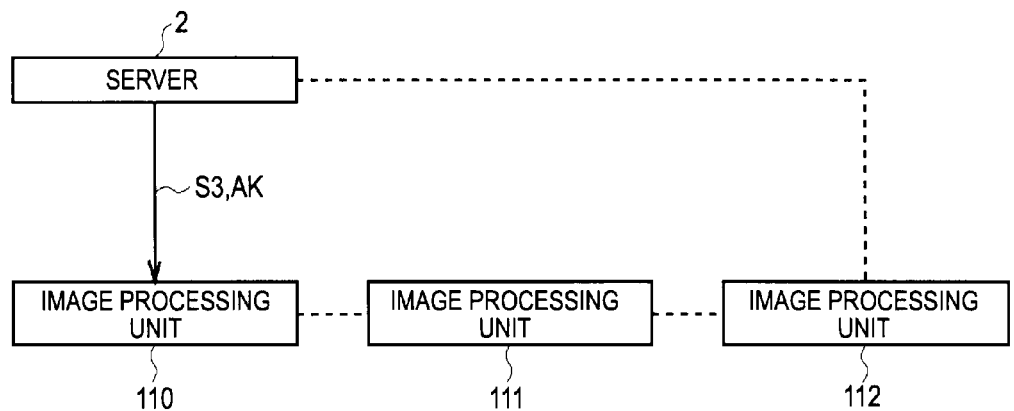
FIG. 12 is a schematic view presented to explain the calculation of the time limit.

As shown in FIG. 12, the program control section 131-110 executes image processing on the supplied image data E1 and calculates a time necessary for image processing per arithmetic processing unit. In this case, the program control section 131-110 executes image processing on a plurality of arithmetic processing units and sets an average time as a time necessary for image processing per arithmetic processing unit, for example.

Figure 13:
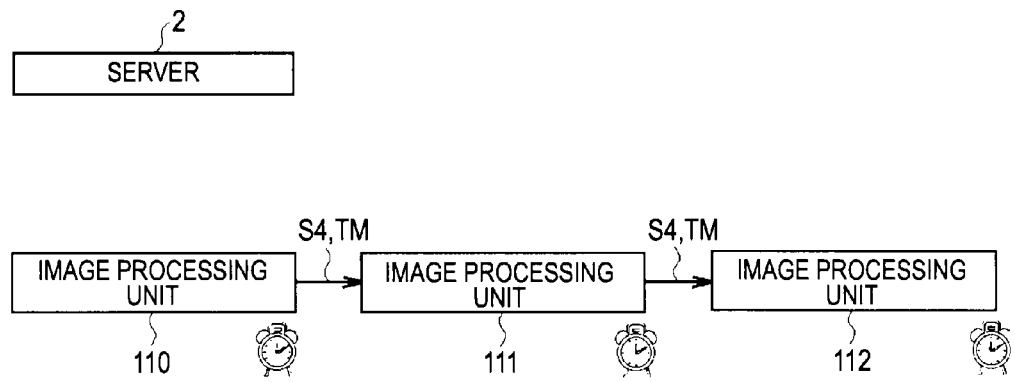
FIG. 13 is a schematic view presented to explain the setting of the time limit.

The program control section 131-110 calculates, as a time limit, the value obtained by dividing the time necessary for image processing per arithmetic processing unit by the number of image processing units provided in the image processing apparatus 103. As shown in FIG. 13, the program control section 131-110 sets the time limit in a limitation information setting section 32-110 and also supplies time limit information TM and a request signal S4, which indicates that the time limit information TM should be set, to the program control sections 131-111 and 131-112.

The program control sections 131-111 and 131-112 set the time limit, which is indicated by the time limit information TM, in limitation information setting sections 32-111 and 32-112.

As a result, the optimal time limit according to image processing is automatically set in the image processing units 110 to 112.

[2-2. Processing Procedure]

Next, the automatic start procedure RT2 executed according to an image processing program will be described using flow charts shown in FIGS. 14 to 16.

After the automatic start procedure RT2 (FIG. 14) starts, the image processing apparatus 103 moves to step SP11. If the image data E1 is supplied from the server 2, the image processing apparatus 103 moves to next step SP12.

In step SP12, the image processing apparatus 103 moves to subroutine SRT11. After processing of checking the number of connected units is executed, the image processing apparatus 103 moves to next step SP13.

In step SP13, the image processing apparatus 103 moves to subroutine SRT12. After limitation information setting processing is executed, the image processing apparatus 103 moves to next step SP14.

Figure 9:
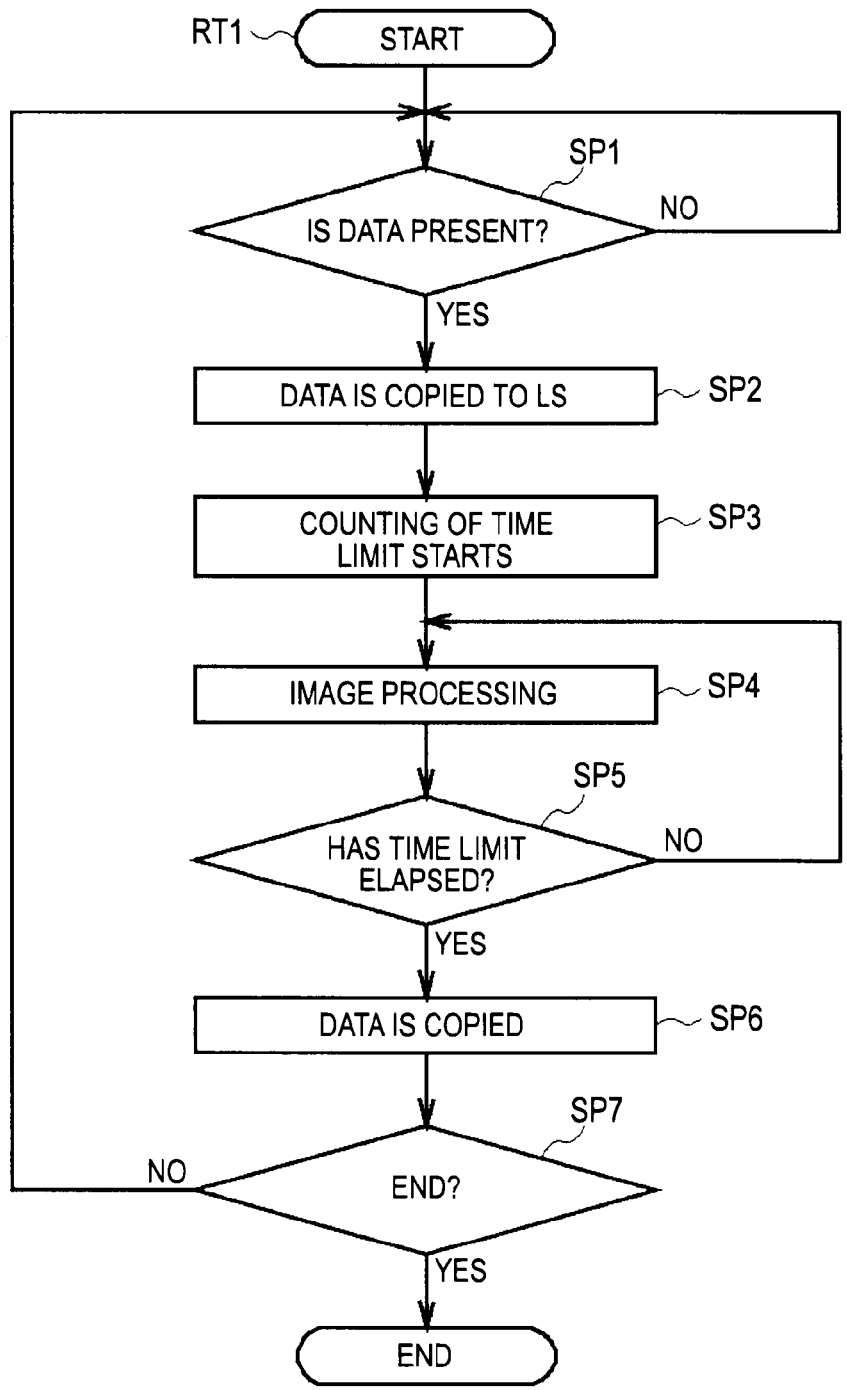
FIG. 9 is a flow chart showing the procedure of the same program parallel processing.

In step SP14, the image processing apparatus 103 executes the same program parallel processing procedure RT1 (FIG. 9). Then, the image processing apparatus 103 moves to the end step to end the processing.

In step SP12 of the automatic start procedure RT2, the image processing unit 110 in the image processing apparatus 103 moves to step SP21 of subroutine SRT11 (FIG. 15). If supply of the identification number ID to each connected image processing unit is requested in step SP21, the image processing unit 110 moves to next step SP22.

In step SP22, the image processing unit 110 waits for the supply of the identification number ID for a predetermined standby time. Then, the image processing unit 110 moves to next step SP23.

In step SP23, the image processing unit 110 recognizes the number of connected image processing units from the number of supplied identification numbers IDs. Then, the image processing unit 110 returns to step SP13 of the automatic start procedure RT2 (FIG. 14).

Figure 16:
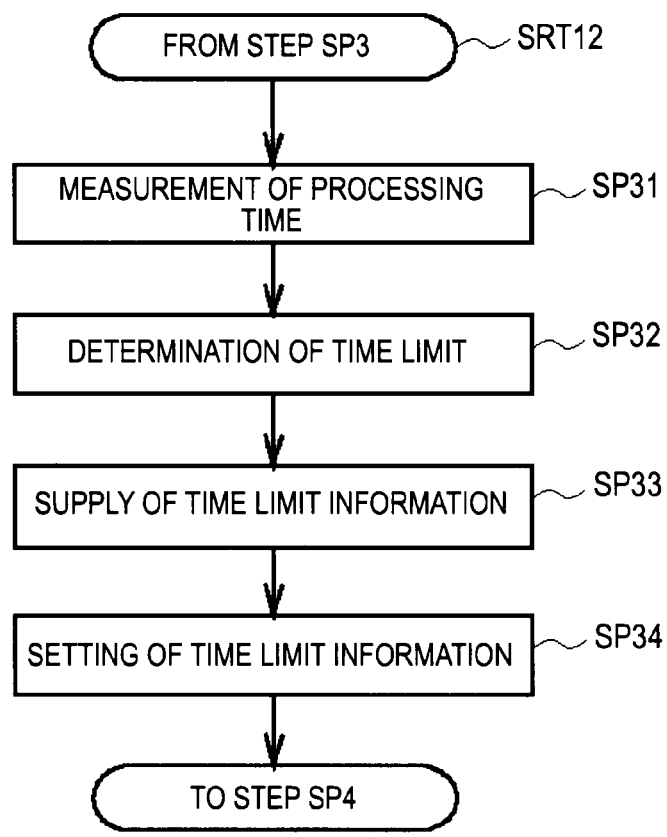
FIG. 16 is a flow chart presented to explain the limitation information setting procedure.

In step SP13 of the automatic start procedure RT2, the image processing unit 110 in the image processing apparatus 103 moves to step SP31 of subroutine SRT12 (FIG. 16). In step SP31, the image processing unit 110 executes image processing on the image data E1 and measures a processing time per arithmetic processing unit. Then, the image processing unit 110 moves to next step SP32.

In step SP32, the image processing unit 110 determines a time limit on the basis of the processing time per arithmetic processing unit measured in step SP31. Then, the image processing unit 110 moves to next step SP33.

In step SP33, the image processing unit 110 generates the time limit information TM indicating the time limit and supplies it to each of the connected image processing units 111 and 112. Then, the image processing unit 110 moves to next step SP34.

In step SP34, the image processing unit 110 sets the time limit in its own limitation information setting section 32. Then, the image processing unit 110 returns to step SP14 of the automatic start procedure RT2 (FIG. 14).

[2-3. Operations and Effects]

In the above configuration, the image processing unit 110 recognizes whether or not it is the end of the image processing apparatus 103 on the basis of the existence of connection of other image processing units to its connecting section, and recognizes that it is the start end of the image processing apparatus 103. When the image processing starts, the image processing unit 110 measures the processing time necessary to execute image processing of the image data E1 of each arithmetic processing unit and calculates the time limit on the basis of the measured processing time. Then, the image processing unit 110 supplies the time limit information TM to the other connected image processing units 111 and 112.

Accordingly, the image processing unit 110 can automatically set the optimal time limit corresponding to the characteristic of the program and the image data E1 in the limitation information setting section 32 without causing a user to do any processing. As a result, it is possible to maximize the throughput of the image processing unit 110 in the image processing apparatus 103, and the user-friendliness can be improved.

The image processing unit 110 counts the number of other image processing units 111 and 112 connected.

Accordingly, the image processing unit 110 can calculate the optimal time limit without causing a user to do any processing.

According to the above configuration, the image processing apparatus 103 measures the processing time, which is necessary for image processing on the image data E1, using one image processing unit 110 and sets the time limit automatically.

Accordingly, the image processing apparatus 103 can set the optimal time limit without giving trouble to a user.

<3. Other Embodiments>

In the first embodiment, the case was described in which the three image processing units 10 to 12 were connected in series to each other. However, the present invention is not limited to this, and there is no limitation in the number of image processing units connected. For example, two or four or more image processing units may be connected in series to each other.

Moreover, in the above embodiment, the case was described in which the image processing apparatus 3 executed image processing on the image data E1. However, the present invention is not limited to this, and the image processing apparatus 3 may execute various kinds of arithmetic processing. For example, the image processing apparatus 3 may execute a program for physical simulation in hydrodynamics or space engineering and a program for shogi (Japanese chess) or chess, for example.

Moreover, in the above embodiment, the case was described in which the time limit was set as limitation information. However, the present invention is not limited to this. For example, the number of frame images or the amount of data may also be set.

Moreover, in the above embodiment, the case was described in which an arithmetic processing unit was based on a frame image. However, the present invention is not limited to this, and there is no limitation in the arithmetic processing unit and an appropriate unit is selected according to the type of data to be processed.

Moreover, in the above embodiment, the case was described in which the image processing units 10 to 12 store the image-processed intermediate data M1 and M2 and the result data R1 in the memory 25 of the subsequent image processing unit. However, the present invention is not limited to this, and there is no particular limitation in the location of the memory 25 which stores the intermediate data M1 and M2 and the result data R1. For example, each of the image processing units 10 to 12 may store the intermediate data M1 and M2 and the result data R1 in its own memory 25. In this case, the intermediate data M1 and M2 is read from an image processing unit (that is, a preceding image processing unit), which has the memory 25 in which the intermediate data M1 and M2 is stored, instead of its own image processing unit.

Moreover, in the above embodiment, the case was described in which image processing was executed after installing a program in advance. However, the present invention is not limited to this, and the server 2 may supply a program together with the image data E1 so that the program is copied simultaneously with image processing. In this case, when the image processing starts, the image processing units 10 and 11 copy and write a program in the memories 25 of the subsequent image processing units 11 and 12 together with the intermediate data M1 and M2 and the progress information. Accordingly, since the image processing apparatus 3 can start the image processing without causing a user to do any operation, it is possible to improve the operability.

Moreover, in the above embodiment, the case was described in which the host controller 26 executed transmission and reception of data. However, the present invention is not limited to this, and the host controller 26 does not have to be necessarily provided. There is no limitation in connection of the bus 29. For example, the bus 29 may connect between the CELLs 24. In this case, for example, the program control section 31 of the CELL 24 executes transmission and reception of data. In addition, the CELL 24 and the memory 25 may be directly connected to the bus 29.

Moreover, in the above embodiment, the case was described in which the subsequent image processing units 11 to 12 started image processing from the final ends of portions of the intermediate data M1 and M2 at which image processing had ended. However, the present invention is not limited to this, and image processing may also be executed on a portion on which image processing has not been executed. There is no limitation in the start position.

Moreover, in the above embodiment, the case was described in which the image processing unit recognized whether or not it was the end in the image processing apparatus 3 on the basis of the existence of connection to the input terminal 21 and the output terminal 22. However, the present invention is not limited to this. For example, the image processing unit may recognize whether or not it is the start end on the basis of supply of the information from the server 2 or connection of the input cable 4 and the output cable 5.

Moreover, in the above embodiment, the case was described in which the CELL 24 which executed an operation in each of the image processing units 10 to 12 executed the pipeline processing. However, the present invention is not limited to this. For example, the same program parallel processing according to the embodiment of the present invention or processing for executing different tasks may also be executed. Moreover, in the present invention, the arithmetic sections do not necessarily have to execute parallel processing.

Moreover, in the above embodiment, the case was described in which the CELL 24 included the eight SPEs 41 to 48 and the program control section 31. However, the present invention is not limited to this, and there is no limitation in the configuration as the arithmetic section. For example, the arithmetic section may be formed by a single processor.

Moreover, in the above embodiment, the case was described in which an alarm was given when the time limit was not proper. However, the present invention is not limited to this, and an alarm does not necessarily have to be given. Moreover, for example, a warning lamp may be turned on or an announcement may be made as warning.

Moreover, in the above embodiment, the case was described in which the remaining time threshold value was set as the rate of the time limit. However, the present invention is not limited to this, and the remaining time threshold value may be set as an actual value (for example, 8 [msec]). The remaining time threshold value may also be arbitrarily set by the user.

Moreover, in the above embodiment, the case was described in which image processing was executed on the plurality of arithmetic processing units and the average value of times necessary for processing was divided by the number of image processing units. However, the present invention is not limited to this. For example, it is also possible to use a time necessary for processing on one arithmetic processing unit. Moreover, in order to give some allowances to the time limit in case of an unexpected situation, for example, a value corresponding to 1.1 times the average value of times necessary for processing may be divided by the number of image processing units.

Moreover, in the above embodiment, the case was described in which an image processing program or the like was stored in a ROM or a hard disk drive in advance. However, the present invention is not limited to this, and it may be installed from an external storage medium, such as a Memory Stick (registered trademark of Sony Corp.), to a flash memory or the like. In addition, the image processing program or the like may also be acquired from the outside through a USB (Universal Serial Bus) or a wireless LAN (Local Area Network), such as Ethernet (registered trademark; Institute of Electrical and Electronics Engineers) 802.11a/b/g. Alternatively, the image processing program or the like may be distributed by terrestrial digital television broadcasting or BS digital television broadcasting.

Moreover, in the above embodiment, the case was described in which the image processing apparatus 3 as an arithmetic processing apparatus was formed by the image processing units 10 to 12 as a plurality of processing units each of which included the limitation information setting section 32 as a limitation information setting section, the memory 25 as a memory, and the input terminal 21 and the output terminal 22 as connecting sections. However, the present invention is not limited to this. For example, in the present invention, the arithmetic processing apparatus may be formed by a plurality of processing units each of which includes a limitation information setting section, a memory, and a connecting section with various kinds of other configurations.

Moreover, in the above embodiment, the case was described in which the image processing system 1 as an arithmetic processing system was formed by the server 2 as a server and the image processing units 10 to 12 as a plurality of processing units each of which included the limitation information setting section 32 as a limitation information setting section, the memory 25 as a memory, and the input terminal 21 and the output terminal 22 as connecting sections. However, the present invention is not limited to this. For example, in the present invention, the arithmetic processing system may be formed by a server and a plurality of processing units each of which includes a limitation information setting section, a memory, a bus, and a connecting section with various kinds of other configurations.

The present invention may be used for image editing apparatuses for professionals or high-precision simulation for scientific research, for example.

The present application contains subject matter related to that disclosed in Japanese Priority Patent Application JP 2009-144535 filed in the Japan Patent Office on Jun. 17, 2009, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An arithmetic processing apparatus comprising:
a plurality of processing units connected in series to each other,
wherein each of the processing units includes
a limitation information setting section that sets limitation information indicating the amount of arithmetic processing that each of the processing units is to process for data of each arithmetic processing unit,
an arithmetic section which
measures a processing time necessary to perform the arithmetic processing on the data of each arithmetic processing unit,
calculates the limitation information based on the measured processing time, and
executes arithmetic processing on the data of each arithmetic processing unit, according to the limitation information set in the limitation information setting section, by the same program between the plurality of processing units; and
a memory in which processing data subjected to the arithmetic processing by the arithmetic section is stored.

2. The arithmetic processing apparatus according to claim 1, wherein the processing units are bus-connected in series to each other.

3. The arithmetic processing apparatus according to claim 2, wherein the arithmetic section recognizes whether or not the processing unit is last processing unit connected in series based on the existence of a connection of the other processing units to a connecting section of the processing unit, and
in repsonse to the arithmetic section recognizing that the processing unit is not the last processing unit connected in series, the arithmetic section executes the arithmetic processing according to the limitation information set in the limitation information setting section and stores the processing data subjected to the arithmetic processing in the memory of a subsequent processing unit.

4. The arithmetic processing apparatus according to claim 3, wherein the arithmetic section stores progress information indicating a progress degree of the arithmetic processing according to the program in the memory of the subsequent processing unit.

5. The arithmetic processing apparatus according to claim 3, wherein the arithmetic section outputs a warning in response to the arithmetic section recognizing that the corresponding processing unit is not the last processing unit connected in series and the arithmetic processing on the data of each arithmetic processing unit ending even though arithmetic processing corresponding to the amount of arithmetic processing to be processed, which is indicated by the limitation information, has not yet been completed.

6. The arithmetic processing apparatus according to claim 5, wherein the arithmetic section outputs a warning in response to the arithmetic section recognizing that the processing unit is the last processing unit connected in series and the arithmetic processing on the data of each arithmetic processing unit is not ending even though arithmetic processing corresponding to the amount of arithmetic processing to be processed, which is indicated by the limitation information, has been executed.

7. The arithmetic processing apparatus according to claim 6, wherein the arithmetic section outputs a warning in response to the arithmetic processing on the data of each arithmetic processing unit having ended within a range corresponding to the amount of arithmetic processing indicated by the limitation information and the amount of remaining arithmetic processing being greater than a predetermined amount.

8. The arithmetic processing apparatus according to claim 1, wherein the arithmetic section has a plurality of calculators and a control section which assigns a plurality of tasks to the plurality of calculators.

9. The arithmetic processing apparatus according to claim 8, wherein the plurality of calculators execute processing on the basis of progress information stored in the memory.

10. The arithmetic processing apparatus according to claim 1, wherein the arithmetic section recognizes whether or not the corresponding processing unit is the end of the arithmetic processing apparatus on the basis of existence of a connection of the other processing units to a connecting section of the processing unit, and
if the arithmetic section recognizes that the corresponding processing unit is a start end of the arithmetic processing apparatus, when starting the arithmetic processing, the arithmetic section supplies the limitation information to the other connected processing units.

11. The arithmetic processing apparatus according to claim 9, wherein the arithmetic section determines the number of other connected processing units.

12. A processing unit comprising:
a limitation information setting section that sets limitation information indicating the amount of arithmetic processing to be processed for data of each arithmetic processing unit;
an arithmetic section which
measures a processing time necessary to perform the arithmetic processing on the data of each arithmetic processing unit,
calculates the limitation information based on the measured processing time, and
executes arithmetic processing on the data of each arithmetic processing unit, according to the limitation information set in the limitation information setting section, by a program;
a memory in which processing data subjected to the arithmetic processing by the arithmetic section is stored; and
a connecting section which is bus-connected in series to another processing unit that executes arithmetic processing according to the same program as for the arithmetic section.

13. An arithmetic processing system comprising:
a plurality of processing units connected in series to each other; and
a server,
wherein each of the processing units includes
a limitation information setting section that sets limitation information indicating the amount of arithmetic processing that each of the processing units is to process for data of each arithmetic processing unit,
an arithmetic section which
measures a processing time necessary to perform the arithmetic processing on the data of each arithmetic processing unit, calculates the limitation information based on the measured processing time, and executes arithmetic processing on the data of each arithmetic processing unit, according to the limitation information set in the limitation information setting section, by the same program between the plurality of processing units, a memory in which processing data subjected to the arithmetic processing by the arithmetic section is stored, and a connecting section which connects between the plurality of processing units, and the server supplies the data of each arithmetic processing unit to the first processing unit connected in series and receives the processing data subjected to the arithmetic processing by the arithmetic section from the last processing unit connected in series.

14. An arithmetic processing method for a plurality of processing units connected in series to each other, the method comprising:

performing a first limitation information setting in order to set limitation information indicating the amount of arithmetic processing to be processed for data of each arithmetic processing unit via a first processing unit bus-connected in series to a second processing unit;

measuring a processing time necessary to perform the arithmetic processing on the data of each arithmetic processing unit;

calculating the limitation information based on the measured processing time;

performing a first calculation in order to execute arithmetic processing on the data of each arithmetic processing unit by the amount of arithmetic processing to be processed;

generating progress information indicating an end part of the arithmetic processing, according to a program and the limitation information set in the first limitation information setting by means of the first processing unit;

performing first storing in order to store processing data subjected to the arithmetic processing in the first calculation via the first processing unit;

performing a second limitation information setting in order to set the same limitation information as in the first limitation information setting via the second processing unit;

performing a second calculation in order to execute arithmetic processing corresponding to data of each arithmetic processing unit, according to the same program as in the first calculation and the limitation information set in the second limitation information setting, for a portion except an end part, which is indicated by the progress information generated in the first calculation, of the processing data subjected to the arithmetic processing in the first calculation; and performing second storing in order to store processing data subjected to the arithmetic processing in the second calculation.

* * * * *